United States Patent
Jacobs

(10) Patent No.: US 8,259,331 B2
(45) Date of Patent: Sep. 4, 2012

(54) CREATING WORKFLOWS FOR A JOB SHOP, ASSIGNING THE WORKFLOWS TO CELLS OF DEVICES, AND SPLITTING THE WORKFLOWS WITHIN COMPLEX CELLS

(75) Inventor: Timothy Wayne Jacobs, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 486 days.

(21) Appl. No.: 12/473,932

(22) Filed: May 28, 2009

(65) Prior Publication Data
US 2010/0306637 A1 Dec. 2, 2010

(51) Int. Cl.
*G06F 3/12* (2006.01)
(52) U.S. Cl. ............... 358/1.15; 709/201; 705/7.12
(58) Field of Classification Search .............. None
See application file for complete search history.

(56) References Cited

U.S. PATENT DOCUMENTS

| | | | |
|---|---|---|---|
| 7,065,567 B1* | 6/2006 | Squires et al. | 709/223 |
| 7,079,266 B1 | 7/2006 | Rai et al. | |
| 2003/0149747 A1 | 8/2003 | Rai et al. | |
| 2007/0091355 A1* | 4/2007 | Rai | 358/1.15 |
| 2008/0285075 A1* | 11/2008 | Yamanakajima | 358/1.15 |

OTHER PUBLICATIONS

Stoer et al.; "A Simple Mini-Cut Algorithm"; Jul. 1997; Journal of the ACM; vol. 44, No. 4; pp. 585-591.*

N. Wu "A Concurrent Approach to Cell Formation and Assignment of Identical Machines in Group Technology", International Journal of Production Research, 1998, vol. 36 No. 8, 2099-2114, Taylor and Francis, London.

Hassan M. Selim "Manufacturing Cell Formation Problem: a Graph Partitioning Approach", Industrial Management and Data Systems, 2002, Abstract, vol. 102, Issue 6, MCB UP Ltd.

* cited by examiner

*Primary Examiner* — Stephen Hong
*Assistant Examiner* — Asher Kells
(74) *Attorney, Agent, or Firm* — Fox Rothschild LLP

(57) ABSTRACT

A system for designing cells in a document production environment may include a computing device and a computer-readable medium in communication with the computing device. The computer-readable medium may include one or more programming instructions for identifying a plurality of jobs associated with the document production environment. Each job may include one or more functions. The computer-readable medium may include one or more programming instructions for generating a representation for each unique job, creating one or more workflows, assigning the workflow to one of a plurality of cells, determining whether one or more of the cells is complex, and splitting at least one workflow within a complex cell. Each cell may include one or more devices.

20 Claims, 6 Drawing Sheets

CREATING WORKFLOWS FOR A JOB SHOP, ASSIGNING THE WORKFLOWS TO CELLS OF DEVICES, AND SPLITTING THE WORKFLOWS WITHIN COMPLEX CELLS

CROSS REFERENCE TO RELATED APPLICATIONS

This application is related to U.S. patent application Ser. No. 12/473,655 filed May 28, 2009.

BACKGROUND

Conventional production environments are organized in a fashion that is functionally independent of job complexity, job mix, and total volume of jobs. Methods of partitioning a manufacturing environment into cells are known, and typically, related production equipment is grouped together. In other words, conventional production environments organize resources into separate departments, where each department corresponds to a type of process or operation that is performed to complete a job.

When a job arrives from a customer, the job sequentially passes through each department. Once the job is completely processed by a first department, the job gets queued for the next department. This approach continues until the job is completed. Unfortunately, this conventional approach leads to significant time delays and increased work-in-progress and inventory costs.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In an embodiment, a system for designing cells in a document production environment may include a computing device and a computer-readable medium in communication with the computing device. The computer-readable medium may include one or more programming instructions for identifying a plurality of jobs associated with the document production environment. Each job may include one or more functions. The computer-readable medium may include one or more programming instructions for generating a representation for each unique job, creating one or more workflows, assigning the workflow to one of a plurality of cells, determining whether one or more of the cells is complex, and splitting at least one workflow within a complex cell. Each cell may include one or more devices.

In an embodiment, a system for designing cells in a job shop may include a computing device and a computer-readable medium in communication with the computing device. The computer-readable medium may include one or more programming instructions for identifying a plurality of jobs associated with the job shop, generating a representation for each unique job, creating one or more workflows, assigning the workflow to one of a plurality of cells, determining whether one or more of the cells is complex, and splitting at least one workflow within a complex cell. Each job may include one or more functions. Each cell may include one or more devices.

BRIEF DESCRIPTION OF THE DRAWINGS

Aspects, features, benefits and advantages of the present invention will be apparent with regard to the following description and accompanying drawings, of which.

DETAILED DESCRIPTION

For purposes of the discussion below, a "job shop" refers to a production environment that processes jobs. A job shop may be a freestanding entity, including one or more print-related devices, or it may be part of another entity. A job shop may include a document production environment. A document production environment may be an environment that includes a plurality of document production devices, such as printers, cutters, collators and the like. In an embodiment, a job shop may include manufacturing production environments or any other production environment that processes jobs.

A "job" refers to a logical unit of work that is to be completed for a customer. For example, in a document production environment, a job may include a print job, which may be processed in pages, batches, units and/or the like. In an alternate embodiment, a job may include an item to be manufactured, processed, assembled and/or the like.

A "print job" refers to a job processed in a document production environment. For example, a print job may include producing credit card statements corresponding to a certain credit card company, producing bank statements corresponding to a certain bank, printing a document or the like.

A "cell" is a grouping of one or more machines, devices, document production devices and/or the like used to process at least a portion of a job, a print job and/or the like.

Figure 1:
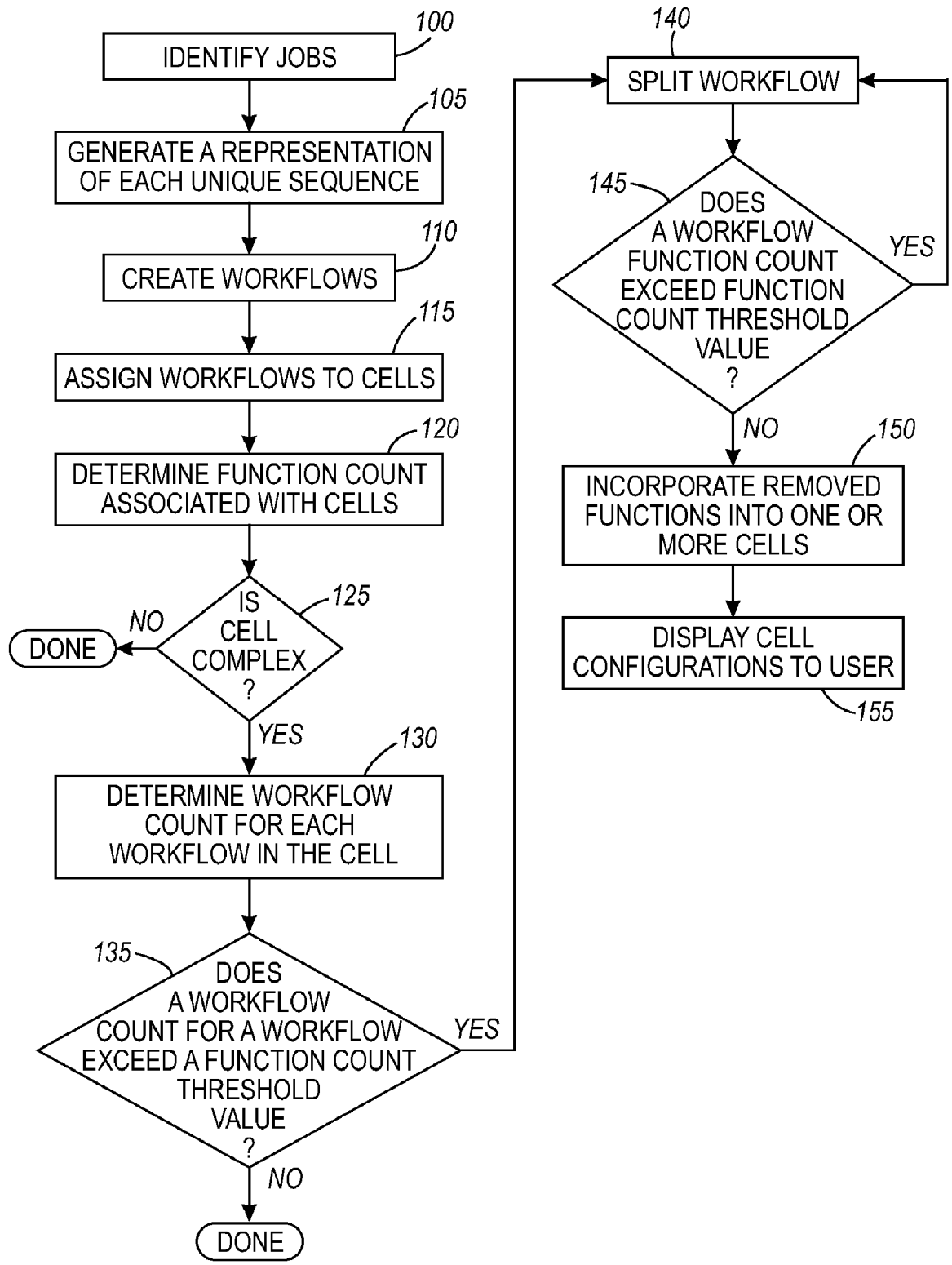
FIG. 1 illustrates an exemplary method of designing cells in a job shop according to an embodiment.

FIG. 1 illustrates an exemplary method of designing cells in a production environment according to an embodiment. In an embodiment, a plurality of jobs may be identified 100. In an embodiment, the jobs may be associated with one or more functions. For example, in a document production environment, a job may include printing a book. The functions associated with this print job may be printing, cutting and binding. In a manufacturing environment, a job may include producing an item. The functions associated with this job may include constructing one or more parts, assembling the parts and finishing the item. In an embodiment, the functions associated with a job may be performed in any sequence.

Figure 2:
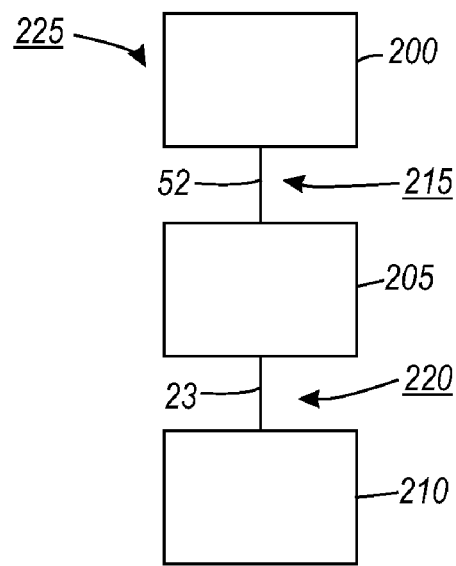
FIGS. 2 and 3 illustrate exemplary graphical representations of jobs according to an embodiment.

In an embodiment, a representation of the functions associated with a job may be generated 105. For example, a graphical representation corresponding to the function may be generated 105. FIG. 2 illustrates an exemplary graphical representation 225 of functions according to an embodiment. As illustrated by FIG. 2, nodes 200, 205, 210 of the graphical representation 225 may represent functions. In an embodiment, the edges 215, 220 between nodes may represent a job volume associated with a corresponding function. For example, an edge may represent a job volume to which a function is applied. A job volume may be a logical unit of work associated with a job. For example, a job volume associated with a print job may be the number of pages associated with the print job, a number of batches associated with the print job, a number of units of the print job and/or the like. Similarly, a job volume associated with a manufacturing job may include a number of parts, a number of batches of parts and/or the like.

Referring to FIG. 2, a print job associated with the graphical representation 225 illustrated in FIG. 2 may be scanned, color printed and punched. In an embodiment, these functions may occur in any sequence. If the job volume associated with the print job in FIG. 2 is represented in pages, then as illustrated by the numbers associated with each of the edges 215, 220, 52 pages of the scanned print job may be printed, and 23 pages of the printed portion of the print job may be punched.

Figure 3:
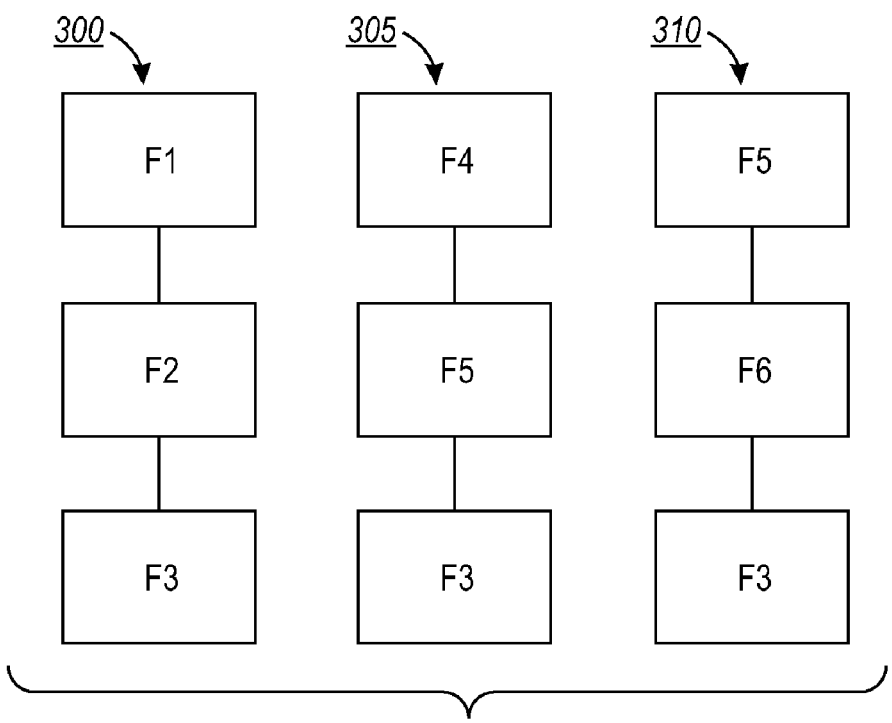

FIG. 3 illustrates exemplary graphical representations associated with three jobs, each of which has a set of corresponding functions. As illustrated by FIG. 3, one graphical representation 300 is associated with the functions {F1, F2, F3}. Another graphical representation 305 is associated with the functions {F4, F5, F3}, and a third graphical representation 310 is associated with the functions {F5 F6, F3}.

In an embodiment, one or more workflows may be created 110. A workflow may be created 110 by combining two or more graphical representations. In an embodiment, the graphical representations to be combined may be identified by identifying one or more oversubscribed functions in the job shop. An oversubscribed function may be a function having a value that is greater than a reference value.

In an embodiment, an oversubscribed function may be identified by determining the number of representations that require one or more functions and the number of production devices in the job shop that perform those functions. In an embodiment, each unique function in the graphical representations in the job shop may be assigned a value. The assigned value may be equal to the difference in value between the number of representations in the job shop that require the function and a number of production devices in the job shop that offer the function. As such, the value may represent the level to which the corresponding function is oversubscribed.

For example, Table 1 illustrates a representation count and production device count for each function in the graphical representations illustrated in FIG. 3. As illustrated in Table 1, one graphical representation 300 requires function F1, and there is one production device in the job shop that are capable of performing function F1. However, three graphical representations 300, 305, 310 require function F3, but there is only one production device that is capable of performing function F3.

TABLE 1

| Function | Representation Count | Production Devices |
|---|---|---|
| F1 | 1 | 1 |
| F2 | 1 | 1 |
| F3 | 3 | 1 |
| F4 | 1 | 1 |
| F5 | 2 | 2 |
| F6 | 1 | 2 |

Table 2 illustrates a chart of exemplary values associated with the functions illustrated in Table 1. For example, referring to Table 1 and FIG. 3, one representation 300 requires function F1, and one production device is capable of performing function F1. As such, the F1 function may have a value of '0' (i.e., 1-1). Similarly, three representations 300, 305, 310 require function F3, but there is only one production device capable of performing F3. As such, function F3 has a value of "2" (i.e., 3-1).

TABLE 2

| Function | Value |
|---|---|
| F1 | 0 |
| F2 | 0 |
| F3 | 2 |
| F4 | 0 |
| F5 | 0 |
| F6 | -1 |

In an embodiment, at least two of the graphical representations may be combined to create 110 a workflow such that the value associated with each unique function in the job shop is less than a reference value. In an embodiment, the reference value may be '1.' As such, representations may be combined into workflows such that each unique function in the job shop is not oversubscribed.

Figure 4:
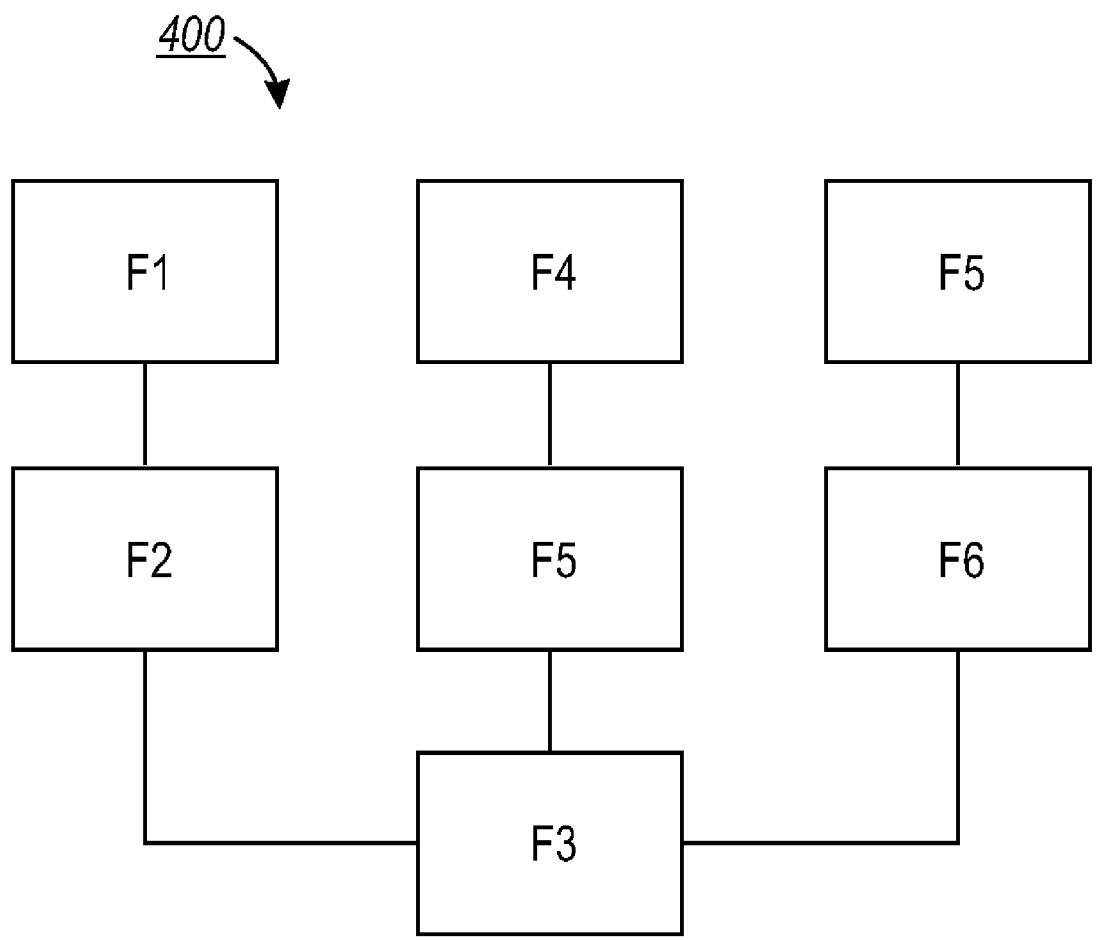
FIG. 4 illustrates an exemplary workflow according to an embodiment.

FIG. 4 illustrates an exemplary workflow 400 that may result from the combination of the graphical representations 300, 305, 310 illustrated in FIG. 3. Referring to Table 2, function F3 is an oversubscribed function in the exemplary job shop. Because three graphical representations 300, 305, 310 require function F3, and because there is only one production device that is capable of performing function F3, the three representations may be combined into a single workflow 400. Additional and/or alternate workflows and/or graphical representations may be used within the scope of this disclosure.

In an embodiment, each workflow may be assigned 115 to a cell in a job shop. A workflow may be assigned 115 to a cell based on the functions associated with the workflow and the production devices associated with the cell. For example, because the workflow illustrated in FIG. 4 includes function F3, it may be assigned 115 to the cell containing the one production device capable of performing function F3.

Figure 5:
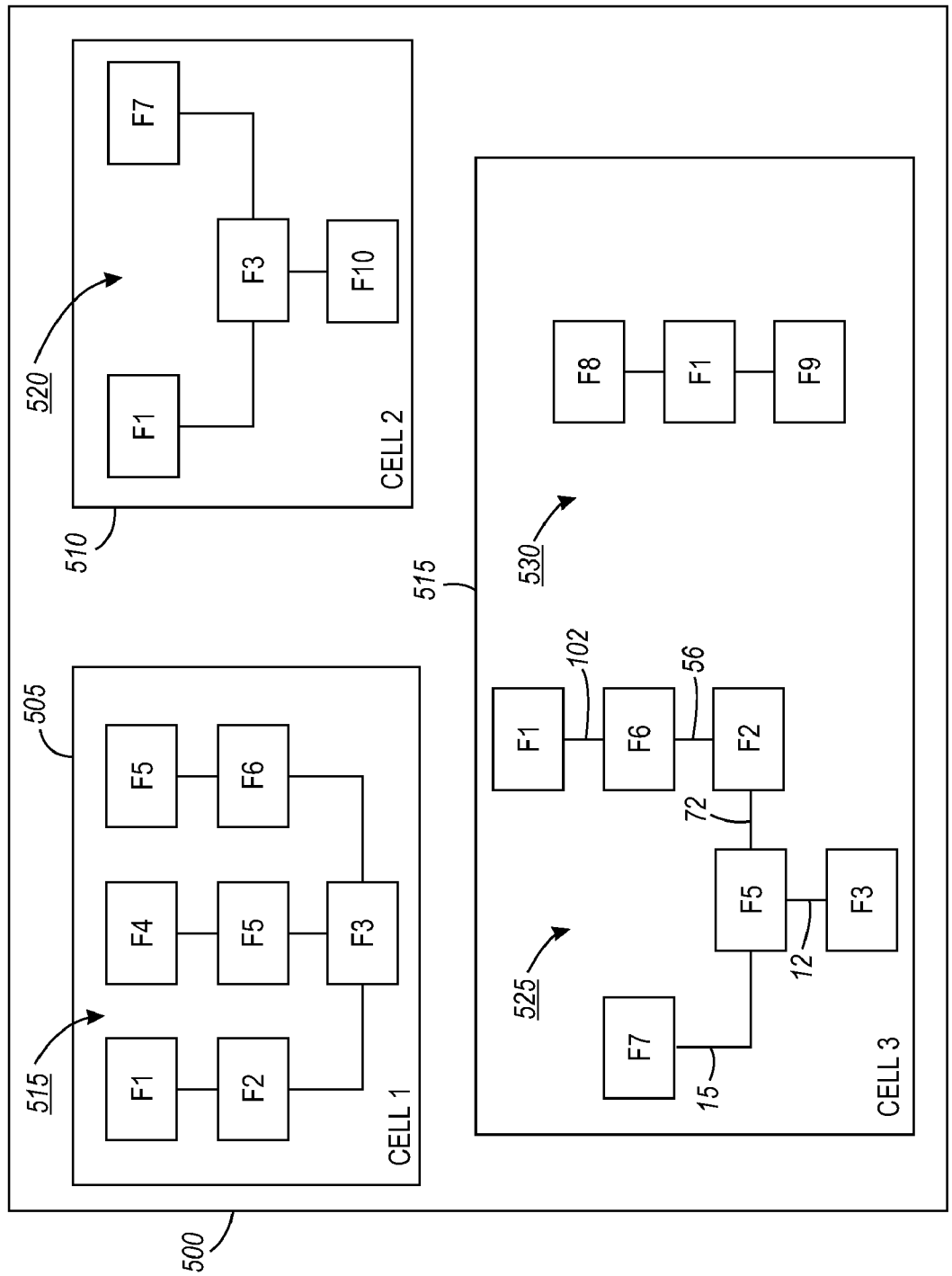
FIG. 5 illustrates an exemplary job shop according to an embodiment.

FIG. 5 illustrates an exemplary job shop 500 having three cells 505, 510, 515, where each cell is assigned 115 one or more workflows 520, 525, 530. In an embodiment, each cell 505, 510, 515 may include one or more production resources, machines, devices and/or the like that are capable of performing one or more functions in the workflow. For example, cell 1 505 may include one or more production devices capable of performing functions F1, F2, F3, F4, F5 and/or F6.

In an embodiment, a cell function count associated with one or more cells may be determined 120. A cell function count may be the number of distinct functions in the cell. For example, referring to FIG. 5, cell 1 505 may have a function count of six because the workflow associated with the cell has six distinct functions (i.e., F1, F2, F3, F4, F5 and F6). Table 3 illustrates function counts associated with the cells 500, 505, 510 illustrated in FIG. 5.

TABLE 3

| Cell | Function Count |
|---|---|
| 1 | 6 |
| 2 | 4 |
| 3 | 8 |

In an embodiment, a cell function count associated with a cell may not exceed a function count threshold value associated with the cell. In an embodiment, a function count threshold value may be a maximum number of distinct functions that may be associated with a cell. The function count threshold value may be determined by a user.

In an embodiment, a cell function count associated with a cell may be compared to a function count threshold value associated with the cell to determine 125 whether the cell is complex. In an embodiment, a complex cell may be one whose cell function count exceeds a function count threshold value associated with the cell. For example, referring to FIG. 5 and Table 3, if the function count threshold value is '5', then the function counts associated with cells 1 505 and 3 515 exceed the function count threshold value. As such, cells 1 505 and 3 515 may be considered complex.

In an embodiment, if a cell is determined to be complex, then a workflow function count for each workflow within the cell may be determined 130. A workflow function count may be the number of distinct functions within a particular workflow. For example, as discussed above, cell 3 515 in FIG. 5 may have a cell function count that exceeds the function count threshold value. As such, a workflow function count may be determined 130 for the workflows 525, 530 associated with cell 3 515. As illustrated by FIG. 5, one workflow 525 in cell 3 515 has a workflow count of '6' while the other workflow 530 has a workflow count of '3.'

In an embodiment, it may be determined 135 whether a workflow function count associated with a workflow in a cell exceeds the function count. If so, the workflow may be split 140 such that the associated workflow function count does not exceed the function count threshold value. In an embodiment, a mincut algorithm may be used to split 140 the workflow by removing one or more functions from the workflow. A mincut algorithm may separate an edge-weighted graph into two or more graphs by removing one or more edges corresponding to one or more weights having the lowest value. Additional and/or alternate algorithms for removing one or more edges from a workflow may be used within the scope of this disclosure.

Figure 6:
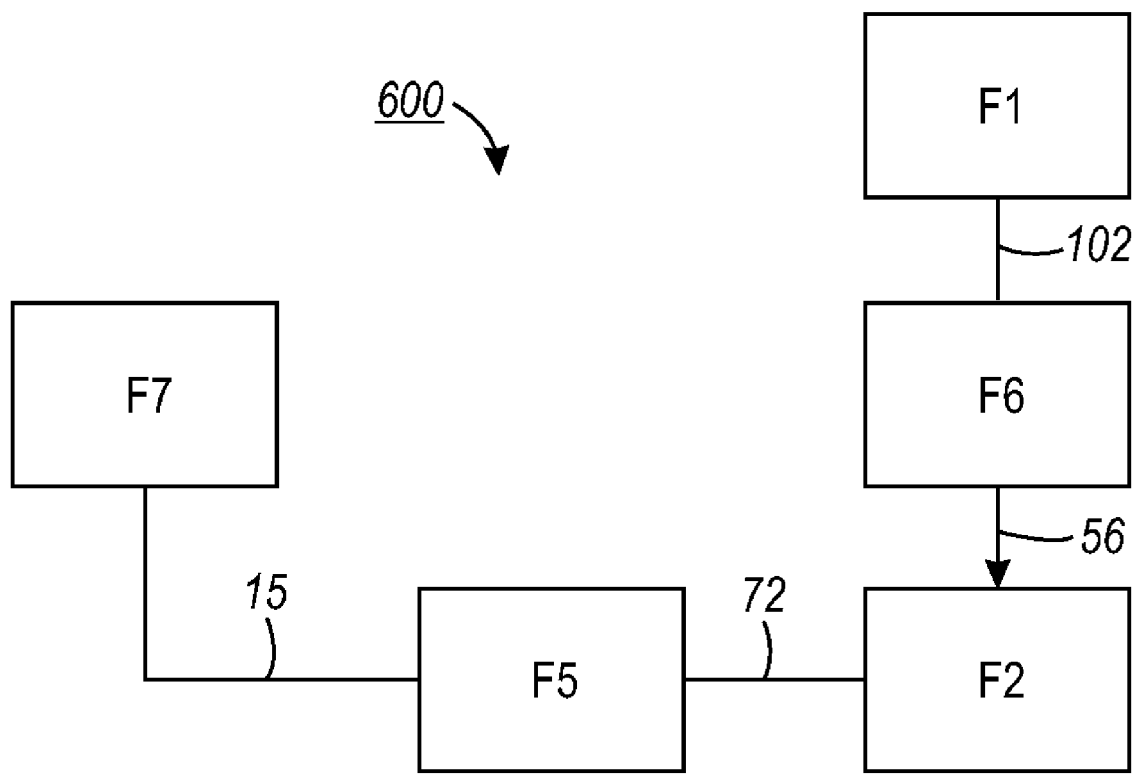
FIG. 6 illustrates a modified workflow according to an embodiment.

In an embodiment, a modified workflow may be created by removing one or more edges associated with the lowest job volume from the workflow. The modified workflow may be split 140 until its workflow function count does not exceed the function count threshold value. For example, as discussed above, cell 3 515 of FIG. 5 may be a complex cell. One workflow 525 within cell 3 515 has a workflow count of '6', which exceeds the function count threshold value of '5.' As such, this workflow may be split 140. For example, the edge associated with the lowest job volume may be removed from workflow. FIG. 6 illustrates a modified workflow 600 that may result from the splitting. In an embodiment, a workflow count may be determined 145 for the modified workflow. If the workflow count associated with the modified workflow exceeds the function count threshold value, the modified workflow may be further split 140 until its associated workflow count does not exceed the function count threshold value. Referring to FIG. 6, the workflow count associated with the modified workflow 600 is '5', so no further splitting 140 may be required.

In an embodiment, the functions associated with the removed edges may be incorporated 150 into another cell. For example, a removed function may be incorporated 150 into an already existing cell such that the function count associated with the cell does not exceed the function count threshold value. In an embodiment, one or more of the removed functions may be added to a newly created cell.

In an embodiment, the cell configurations of one or more cells may be displayed 155 to a user. For example, representations of one or more cells, representations of one or more workflows within a cell, representations of one or more functions within a workflow and/or the like may be displayed to a user. In an embodiment, cell configurations may be displayed to a user via a computing device, a display device and/or the like.

Figure 7:
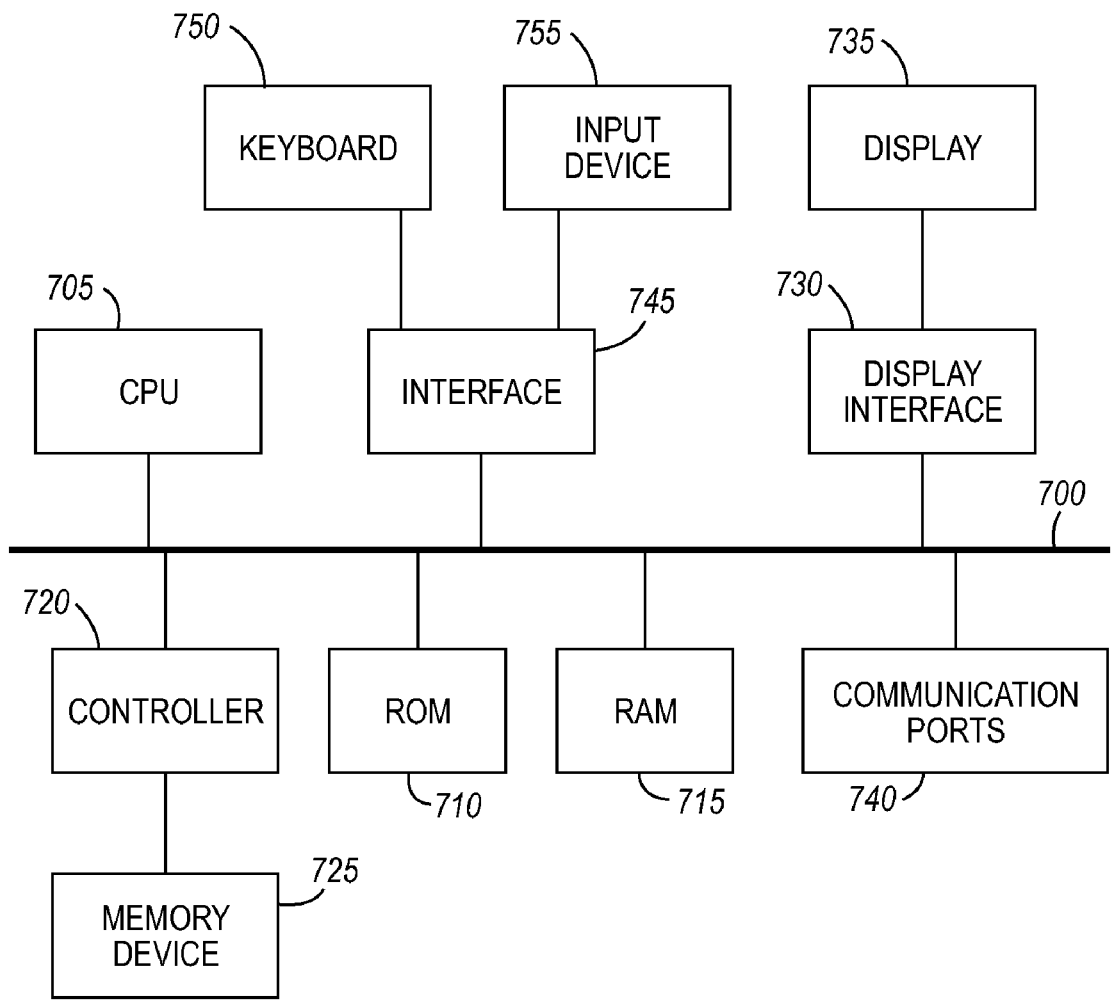
FIG. 7 illustrates a block diagram of exemplary internal hardware that may be used to contain or implement program instructions according to an embodiment.

FIG. 7 depicts a block diagram of exemplary internal hardware of a computing device that may be used to contain or implement program instructions according to an embodiment. A bus 700 serves as the main information highway interconnecting the other illustrated components of the hardware. CPU 705 is the central processing unit of the system, performing calculations and logic operations required to execute a program. Read only memory (ROM) 710 and random access memory (RAM) 715 may constitute exemplary memory devices.

A controller 720 interfaces with one or more optional memory devices 725 to the system bus 700. These memory devices 725 may include, for example, an external or internal DVD drive, a CD ROM drive, a hard drive, flash memory, a USB drive or the like. As indicated previously, these various drives and controllers are optional devices.

Program instructions may be stored in the ROM 710 and/or the RAM 715. Optionally, program instructions may be stored on a tangible computer readable medium such as a compact disk, a digital disk, flash memory, a memory card, a USB drive, an optical disc storage medium, such as Blu-ray™ disc, and/or other recording medium.

An optional display interface 730 may permit information from the bus 700 to be displayed on the display 735 in audio, visual, graphic or alphanumeric format. Communication with external devices may occur using various communication ports 740. An exemplary communication port 740 may be attached to a communications network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for designing cells in a job shop, the system comprising:
   a computing device; and
   a computer-readable storage medium in communication with the computing device, wherein the computer-readable storage medium comprises one or more programming instructions for execution with the computing device, the programming instructions comprising one or more programming instructions for:

identifying a plurality of jobs associated with the job shop, wherein each job comprises one or more functions, generating a representation for each unique job, creating one or more workflows by:

for each unique function in the job shop:
determining a number of representations that require the function,
determining a device count representative of a number of production devices in the job shop that perform the function, and
determining a value equal to the difference between the number of representations that require the function and the device count; and
for each function whose associated value exceeds a reference value, combining a plurality of the representations such that the value of the function does not exceed the reference value, assigning the one or more workflows to one of a plurality of cells, wherein each cell comprises one or more devices, determining whether one or more of the cells is complex, and splitting at least one workflow within a complex cell.

2. The system of claim 1, further comprising a user interface having a display, wherein the display is configured to display information corresponding to a cell configuration of the job shop.

3. The system of claim 1, wherein the one or more programming instructions for generating a representation comprise one or more programming instructions for generating a graphical representation of each unique job.

4. The system of claim 1, wherein the reference value is one.

5. The system of claim 1, wherein the one or more programming instructions for assigning the workflow to one of a plurality of cells comprise one or more programming instructions for assigning the workflow to a cell having one or more devices for performing the functions in the workflow.

6. The system of clam 1, wherein the one or more programming instructions for determining whether one or more of the cells is complex comprise one or more programming instructions for:
determining a cell function count for each cell; and
in response to the cell count exceeding a cell function count threshold value, identifying the cell as complex.

7. The system of claim 6, wherein the one or more programming instructions for splitting at least one workflow comprise one or more programming instructions for:
determining a workflow count for each workflow in the complex cell; and
in response to the workflow count exceeding the function count threshold value, splitting the workflow into a modified workflow and a removed portion,
wherein each workflow comprises a plurality of nodes and one or more edges connecting the plurality of nodes.

8. The system of claim 7, wherein the one or more programming instructions for splitting the workflow comprise one or more programming instructions for:
splitting the workflow by removing one or more edges associated with a lowest job volume value, wherein the removed portion comprises one or more nodes and one or more edges of the workflow associated with the one or more removed edges, wherein the modified workflow comprises one or more nodes and one or more edges of the workflow not associated with the one or more removed edges.

9. The system of claim 7, wherein the computer-readable storage medium further comprises one or more programming instructions for:
repeating the determining and the splitting until the workflow count does not exceed the function count threshold value.

10. The system of claim 7, wherein the one or more programming instructions for incorporating the removed portion into one of the plurality of cells comprise one or more programming instructions for incorporating the removed portion into one of the plurality of cells such that a function count associated with the cell does not exceed a function count threshold value.

11. The system of claim 7, wherein:
each node represents a function; and
each edge is associated with a job volume value.

12. The system of claim 1, wherein the one or more production devices comprise one or more of the following:
a printing device; and
a finishing device.

13. A method of designing cells in a job shop, the method comprising:
identifying a plurality of jobs associated with the job shop, wherein each job comprises one or more functions;
generating a representation for each unique job;
creating one or more workflows by:
for each unique function in the job shop:
determining a number of representations that require the function,
determining a device count representative of a number of production devices in the job shop that perform the function, and
determining a value equal to the difference between the number of representations that require the function and the device count, and
for each function whose associated value exceeds a reference value, combining a plurality of the representations such that the value of the function does not exceed the reference value,
assigning the one or more workflows to one of a plurality of cells, wherein each cell comprises one or more devices;
determining whether one or more of the cells is complex; and
splitting at least one workflow within a complex cell.

14. The method of claim 13, wherein generating a representation comprises generating a graphical representation of each unique job.

15. The method of claim 13, wherein determining whether one or more cells is complex comprises:
determining a cell function count for each cell; and
in response to the cell count exceeding a cell function count threshold value, identifying the cell as complex.

16. The method of claim 15, wherein splitting at least one workflow comprises:
determining a workflow count for each workflow in the complex cell; and
in response to the workflow count exceeding the function count threshold value, splitting the workflow into a modified workflow and a removed portion;
wherein each workflow comprises a plurality of nodes and one or more edges connecting the plurality of nodes.

17. The method of claim 16, wherein splitting the workflow comprises:
splitting the workflow by removing one or more edges associated with a lowest job volume value, wherein the removed portion comprises one or more nodes and one or more edges of the workflow associated with the one or more removed edges, wherein the modified workflow comprises one or more nodes and one or more edges of the workflow not associated with the one or more removed edges.

18. The method of claim 16, further comprising repeating the determining and the splitting until the workflow count does not exceed the function count threshold value.

19. The method of claim 16, wherein incorporating the removed portion into one of the plurality of cells comprises incorporating the removed portion into one of the plurality of cells such that a function count associated with the cell does not exceed a function count threshold value.

20. The method of claim 16, wherein:
each node represents a function; and
each edge is associated with a job volume value.

* * * * *